(12) United States Patent
Gavette et al.

(10) Patent No.: US 7,162,013 B2
(45) Date of Patent: Jan. 9, 2007

(54) HOME NETWORK TELEPHONE ANSWERING SYSTEM AND METHOD FOR SAME

(75) Inventors: Sherman L. Gavette, Camas, WA (US); Carl Mansfield, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 45 days.

(21) Appl. No.: 10/313,863

(22) Filed: Dec. 6, 2002

(65) Prior Publication Data

US 2003/0142795 A1 Jul. 31, 2003

Related U.S. Application Data

(63) Continuation-in-part of application No. 10/140,402, filed on May 6, 2002, and a continuation-in-part of application No. 10/112,909, filed on Mar. 27, 2002, now Pat. No. 6,882,714, and a continuation-in-part of application No. 10/102,245, filed on Mar. 20, 2002, and a continuation-in-part of application No. 10/066,487, filed on Jan. 31, 2002, now Pat. No. 6,693,996, which is a continuation-in-part of application No. 10/066,486, filed on Jan. 31, 2002, now Pat. No. 7,023,975.

(51) Int. Cl.
  *H04M 1/64* (2006.01)

(52) U.S. Cl. .................... 379/70; 379/88.12

(58) Field of Classification Search .......... 379/67.1, 379/88.12, 88.18, 88.22, 88.11, 70
See application file for complete search history.

(56) References Cited

U.S. PATENT DOCUMENTS

| 4,807,225 | A | * | 2/1989 | Fitch | ........................... 370/295 |
| 5,022,069 | A | * | 6/1991 | Chen | ........................ 379/67.1 |
| 5,317,631 | A | * | 5/1994 | Chen | ........................... 379/164 |
| 5,394,445 | A | * | 2/1995 | Ball et al. | ................... 379/88.21 |
| 5,550,900 | A | * | 8/1996 | Ensor et al. | ............... 379/88.11 |
| 5,596,631 | A | * | 1/1997 | Chen | ........................... 379/177 |
| 5,623,537 | A | * | 4/1997 | Ensor et al. | ................ 379/88.2 |
| 5,652,753 | A | * | 7/1997 | Kopp et al. | ................... 370/489 |
| 5,748,709 | A | * | 5/1998 | Sheerin | .................... 379/88.22 |
| 5,809,111 | A | * | 9/1998 | Matthews | ...................... 379/31 |
| 5,913,163 | A | | 6/1999 | Johansson | |
| 5,956,389 | A | * | 9/1999 | Jung | ......................... 379/88.12 |

(Continued)

FOREIGN PATENT DOCUMENTS

WO    WO 94/27394    * 11/1994

(Continued)

*Primary Examiner*—Fan Tsang
*Assistant Examiner*—Olisa Anwah
(74) *Attorney, Agent, or Firm*—Law Office of Gerald Maliszewski; Gerald Maliszewski

(57) ABSTRACT

A system and method are provided for answering Home Network telephone calls. The method comprises: receiving telephone calls addressed to a Home Network endpoint; routing the received calls from a gateway to the endpoint; and, automatically recording the received call at a telephone answering device (TAD). The call can be recorded by an endpoint, the gateway, or an external line service provider facility central office or web site. Telephone calls can be addressed to an endpoint from external communication media or another endpoint. Some aspects of the method include sending notification that a message has been recorded. The gateway may initiate the notification. Alternately, the gateway may receive a request for any TAD information that may exist for an addressed endpoint, and if a message exists, the TAD creates a bridge between the TAD and a requesting entity to forward the notification.

23 Claims, 5 Drawing Sheets

U.S. PATENT DOCUMENTS

| | | |
|---|---|---|
| 5,983,100 A | 11/1999 | Johansson et al. |
| 6,094,441 A | 7/2000 | Jung et al. |
| 6,097,732 A | 8/2000 | Jung |
| 6,219,411 B1 * | 4/2001 | Peters et al. ................. 379/177 |
| 6,223,029 B1 | 4/2001 | Stenman et al. |
| 6,298,122 B1 * | 10/2001 | Horne ..................... 379/93.09 |
| 6,377,665 B1 | 4/2002 | Willer |
| 6,414,952 B1 * | 7/2002 | Foley ......................... 370/352 |
| 6,456,633 B1 * | 9/2002 | Chen .......................... 370/490 |
| 6,526,581 B1 * | 2/2003 | Edson .......................... 725/74 |
| 6,553,102 B1 * | 4/2003 | Fogg et al. ............... 379/88.25 |
| 6,556,663 B1 * | 4/2003 | Danner et al. ............. 379/67.1 |
| 6,738,470 B1 * | 5/2004 | Aronovitz .............. 379/220.01 |
| 6,778,549 B1 * | 8/2004 | Keller ........................ 370/430 |
| 6,798,767 B1 * | 9/2004 | Alexander et al. .......... 370/352 |
| 6,823,047 B1 * | 11/2004 | Cruickshank ............ 379/88.18 |
| 2001/0055954 A1 * | 12/2001 | Cheng ....................... 455/74.1 |
| 2002/0031226 A1 | 3/2002 | Simonsen et al. |
| 2002/0046407 A1 | 4/2002 | Franco |
| 2002/0061095 A1 | 5/2002 | Beecroft |
| 2002/0090961 A1 | 7/2002 | Walley et al. |
| 2002/0123326 A1 | 9/2002 | Iyengar et al. |
| 2002/0168056 A1 * | 11/2002 | Binal ..................... 379/93.09 |
| 2003/0056226 A1 * | 3/2003 | Lazarus et al. ............. 725/129 |

FOREIGN PATENT DOCUMENTS

| | | |
|---|---|---|
| WO | WO0027075 | 5/2000 |

* cited by examiner

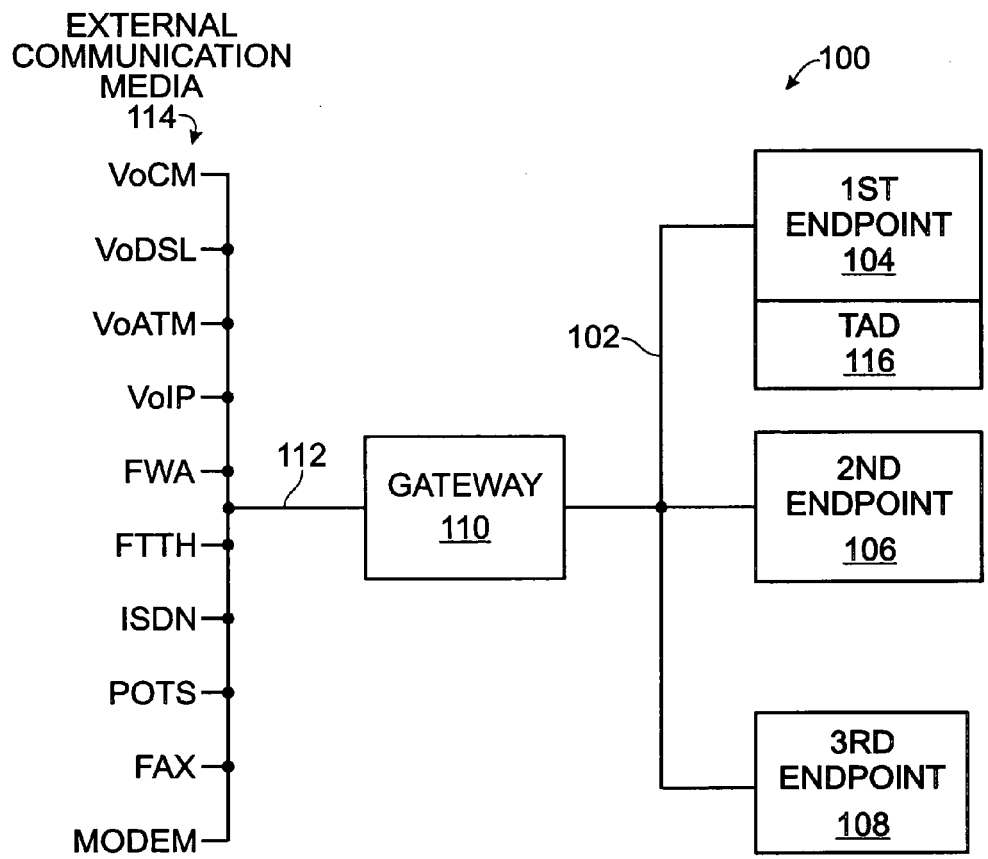
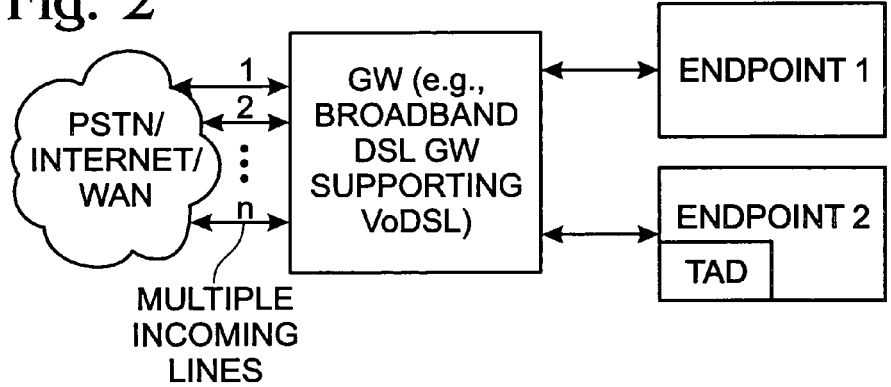

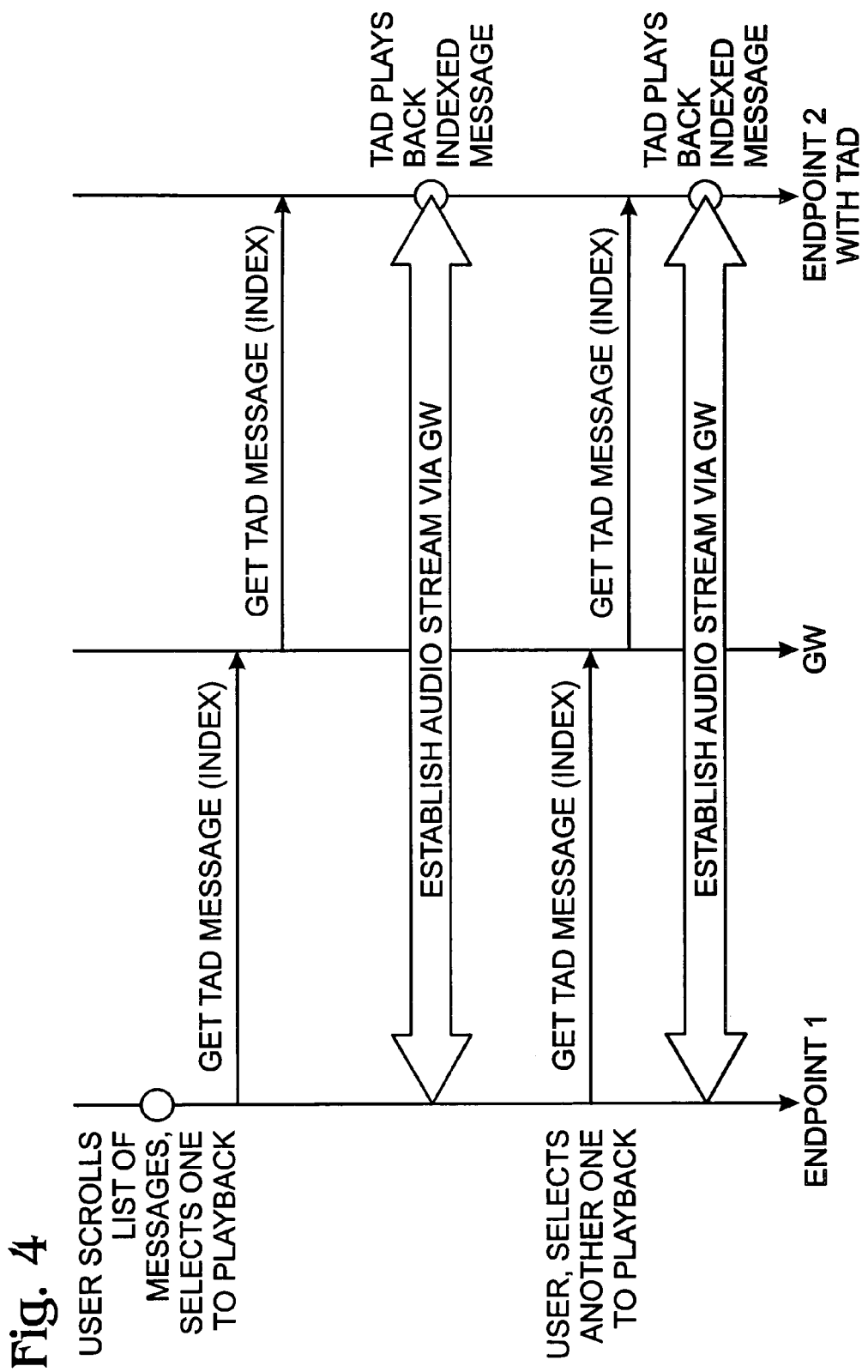

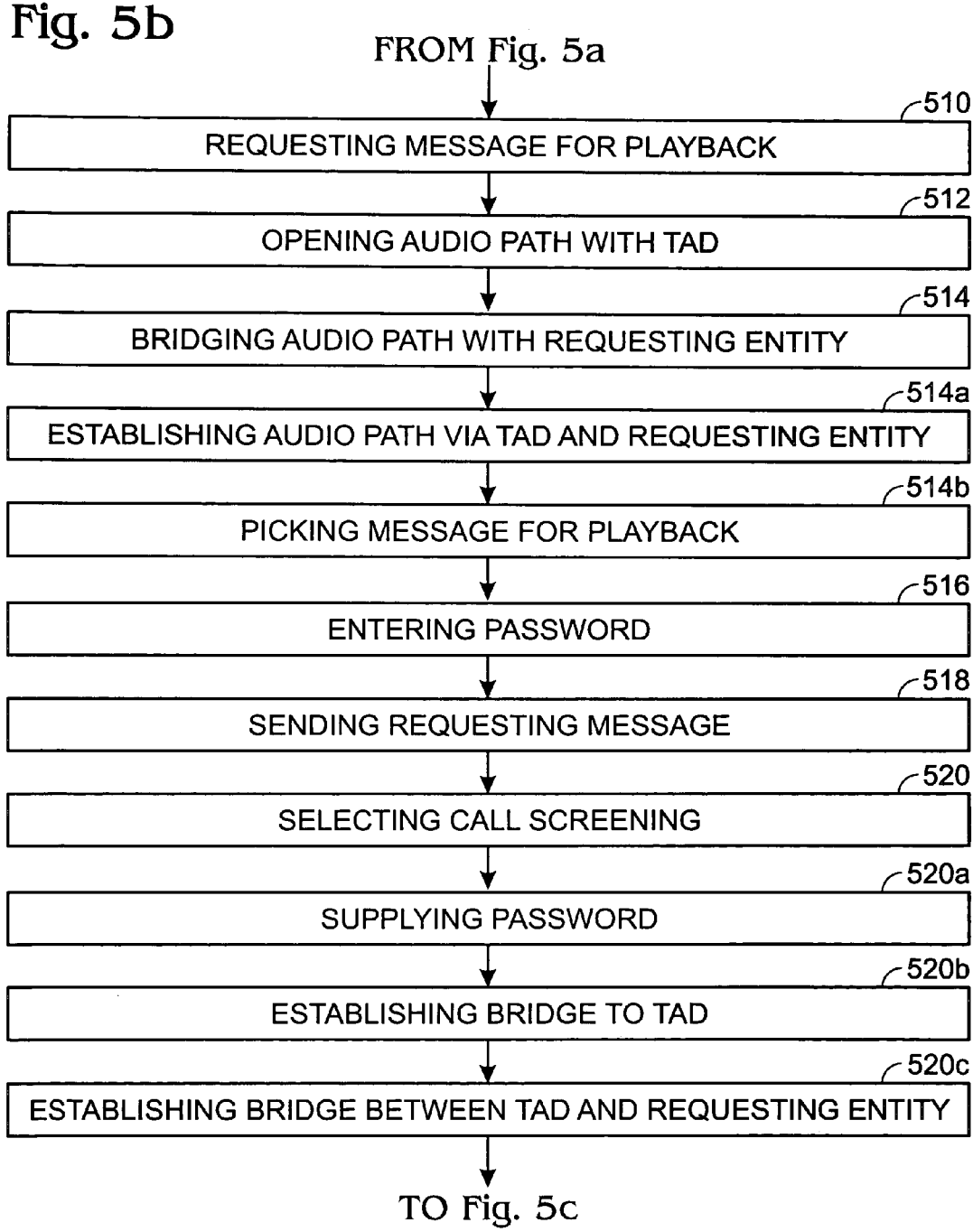

HOME NETWORK TELEPHONE ANSWERING SYSTEM AND METHOD FOR SAME

RELATED APPLICATIONS

This application is a continuation-in-part of a patent application entitled, PRIVACY MODE SYSTEM AND METHOD FOR HOME NETWORK TELEPHONE, invented by Mansfield et al., Ser. No. 10/066,486, filed Jan. 31, 2002 now U.S. Pat. No. 7,023,975.

This application is a continuation-in-part of a patent application entitled, SYSTEM AND METHOD FOR VIRTUAL MULTILINE TELPHONY IN A HOME NETWORK TELEPHONE, invented by Mansfield et al., Ser. No. 10/140,402, filed May 6, 2002.

This application is a continuation-in-part of a patent application entitled, SYSTEM AND METHOD FOR DATA BACKUP IN HOME NETWORK TELEPHONE, invented by Mansfield et al., Ser. No. 10/066,487, filed Jan. 31, 2002 now U.S. Pat. No. 6,693,996.

This application is a continuation-in-part of a patent application entitled, SYSTEM AND METHOD FOR A HOME NETWORK TELEPHONE UNIVERSAL PHONEBOOK, invented by Mansfield et al., Ser. No. 10/102,245, filed Mar. 20, 2002.

This application is a continuation-in-part of a patent application entitled, UNIVERSAL CALL-LOG SYSTEM AND METHOD FOR HOME NETWORK TELEPHONE, invented by Mansfield et al., Ser. No. 10/112,909, filed Mar. 27, 2002 now U.S. Pat. No. 6,882,714.

BACKGROUND OF THE INVENTION

1. Field of the Invention

This invention generally relates to Home Network telephone systems and, more particularly, to a system and method for using a telephone answering device (TAD) to record voice mail messages for entities in a Home Network telephone system.

2. Description of the Related Art

Service providers are rolling out multiline, broadband telephony services using, for example, DSL, cable modem, or fixed-wireless broadband access, to carry more than one line of voice data. These carriers desire to deploy telephones that have multiline broadband telephony support in residential, small office home office (SOHO) and small and medium enterprises (SME) environments that subscribe to these broadband telephony services.

In current multiline integrated services digital network (ISDN) or plain old telephone service (POTS) telephones, all of the available external telephone lines terminate at the telephone itself. This allows for easy switching between lines, line selection, indications of line status, control of line-hold, and multiparty conferencing capabilities. The majority of current POTS multiline telephones limit the number of lines supported to two. Typical residential POTS wiring comprise two pairs and can readily support up to two lines, but no more. In current multiline telephones, although all the supported lines terminate at the multiline phone itself, typically only one voice stream is active in a telephone call at any given time, since the multiline phone typically has only one mouthpiece and earpiece.

Home Network telephony systems are emerging that support multiple internally connected home network telephony devices such as telephones, fax machines, and multifunctional peripherals (MFPs). Typically, such home network telephone devices share a digital home network transmission media, such as a standard phoneline, an AC powerline, dedicated hardwires (such as Ethernet), or a wireless channel. Telephony adapters exist that allow a legacy analog phone to plug into and use digital home network telephony. Likewise, integrated telephony devices are emerging that directly incorporate the digital home network telephony interface.

However, conventional home network telephony devices and adapters support only one audio path (channel) across the home network. This limitation is highly desirable for low cost service. However, conventional multiline telephony systems require that all the telephone lines that are available at an endpoint, be physically terminated at that endpoint, and support multiple simultaneous audio paths (one per telephone line) to the multiline endpoint.

Several conventional residential and SOHO telephones are able to log the calls that are made (originated), as well as incoming calls that are either answered or missed. In the latter case, this call-log is only useful if calling line ID (CLID) is supported since, without CLID, the call-log cannot identify the number of the caller. Often, call-logs are cross-referenced with phonebook entries, so that the call-log can show a more meaningful ASCII name, herein referred to as a descriptor, to identify the caller, rather than just the number. Likewise, a number in a call-log can typically be saved directly into a phonebook, with the user only needing to type the ASCII name.

It would be advantageous if a Home Network telephone system included a central TAD entity that recorded voice mail messages for Home Network endpoints with different addresses or telephone numbers.

It would be advantageous if notice could be served of the existence of voice mail messages that have been received by a Home Network telephone system TAD.

It would be advantageous if the Home Network telephone system could relay recorded voice mail messages to addresses in an external system or other endpoints in the Home Network system.

SUMMARY OF THE INVENTION

A system and method are provided for a Home Network TAD system. A Home Network, or a network within a SOHO or business, supports voice telephony, multiple incoming lines (digital, analog or a combination thereof), multiple extensions, and the capability of bridging two or more extensions onto a single call. The present invention TAD system resides within the context of the Home Network and supports the basic functionality provided by traditional TADs. Further, the TAD permits the called party to receive notification of, and information concerning incoming calls that occur at times when it is inconvenient or impossible to answer them directly.

Accordingly, a method for answering Home Network telephone calls comprises: receiving telephone calls addressed to a Home Network endpoint; routing the received calls from a Home Network gateway to the endpoint; and, automatically recording the received call at a TAD. Typically, these are calls that are not answered by the addressed endpoint.

The call can be recorded by a Home Network endpoint, the gateway, and an external line service provider facility selected from the group including a telephone central office and a web site. Telephone calls can be addressed to a Home Network endpoint from communication media that include voice over ATM (VoATM), voice over cable modem (VoCM), voice over DSL (VoDSL), voice over Internet protocol (VoIP), fixed wireless access (FWA), fibre to the home (FTTH), integrated service digital network (ISDN), and plain old telephone service (POTS), and internal line calls from (other) Home Network endpoints.

The Home Network endpoint receiving calls can be a device such as a telephone, fax machine, personal data assistant (PDA), personal computer (PC), modem, multi-function peripheral (MFP), video-telephone, wireless communication device, and hardwired communications device.

Some aspects of the method include sending notification that a message has been recorded for the addressed endpoint. The gateway may initiate the notification. Alternately, the gateway may receive a request for any TAD information that may exist for the addressed endpoint, and if a message exists, the TAD creates a bridge between the TAD and a requesting entity to forward the notification. The notification may include information such as the calling telephone number, the name of the calling party, the time of the recording, the recording length, or the memory state of the TAD.

Other aspects of the method further comprise: selecting a message for playback in response to receiving a notification message. The entity requesting the playback need not necessarily be the addressed endpoint. Some aspects of the method comprise: opening an audio path with the TAD, in response to selecting a message for playback; and, bridging the audio path with an audio path to the requesting entity.

Another aspect of the method comprises: selecting the call screening function in response to receiving the call, where selecting the call screening function includes: establishing a bridge for the TAD to receive a call addressed to the endpoint; establishing a bridge between the TAD and the endpoint requesting the call screening function.

Additional details of the above-described method and a system for answering Home Network telephone calls are provided in detail below.

BRIEF DESCRIPTION OF THE DRAWINGS

FIG. 1 is a schematic block diagram illustrating the present invention system for answering Home Network telephone calls.

FIG. 2 shows a simple voice network with multiple incoming lines and two endpoints.

FIG. 4 illustrates the process for playback of a recorded message.

FIGS. 5a through 5c are flowcharts illustrating the present invention method for answering Home Network telephone calls.

DETAILED DESCRIPTION OF THE PREFERRED EMBODIMENTS

Figure 3:
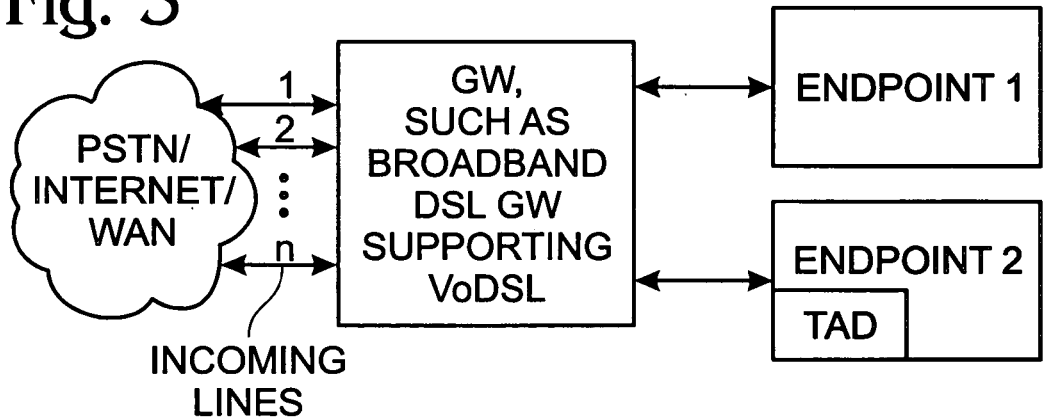
FIG. 3 shows a simple mapping of external line 1 to endpoint (Ext.) 1 and external line 2 to endpoint (Ext.) 2.

FIG. 1 is a schematic block diagram illustrating the present invention system for answering Home Network telephone calls. The system 100 comprises at least one endpoint having a port on line 102 to transceive Home Network telephone communications. Shown are three endpoints, first endpoint 104, second endpoint 106, and third endpoint 108. However, the invention is not limited to any particular number of system endpoints. The endpoints can be telephones, fax machines, personal data assistants (PDAs), personal computers (PCs), modems, multi-function peripherals (MFPs), video-telephones, wireless communication devices, or hardwired communications devices. The Home Network endpoints are similar to extension phones in a conventional phone system. An endpoint has a unique address that is not shared by any other endpoints. However, multiple phone numbers can be mapped to an endpoint. Further, a phone number can be mapped to more than one endpoint (address).

Note that the endpoints 104/106/108 are connected to a line (line 102) that represents a shared channel. For example, the channel can be a wireless channel, conventional phoneline, hardline, ac powerline, or Ethernet connection to name but a few examples. As noted above, although every endpoint in the system 100 necessarily has a unique address, a phone number can be mapped to multiple endpoints, just as multiple extensions in a conventional two-wire POTS residential system ring in response to a received call.

A gateway 110 has a port on line 112 to transceive telephone communication between an endpoint and external communication media 114. The external line communication media possibilities include voice over ATM (VoATM), voice over cable modem (VoCM), voice over DSL (VoDSL), voice over Internet protocol (VoIP), fixed wireless access (FWA), fibre to the home (FTTH), integrated service digital network (ISDN), and plain old telephone service (POTS). The present invention is not limited to any particular forms of external communications media.

A telephone answering device (TAD) 116 has a port on line 102 to accept and automatically record received calls addressed to, but not answered by an endpoint. The TAD 116 can be a Home Network multifunction endpoint, a single-purpose Home Network device, the gateway, and an external line service provider facility such as a telephone central office or a web site. In instances where the TAD 116 is an external line service provider facility, it may be conceptually simpler to envision the TAD 116 as being connected on line 112. As shown, the TAD 116 is associated with the first endpoint 104. In a simple example, the gateway 110 receives a call addressed to the second endpoint 106, and the first endpoint 104, performing the TAD function, records the call addressed to the second endpoint 106. Analogous to the operation of conventional TADs, the gateway 110 typically waits a predetermined amount of time for a response from the second endpoint 106 and reroutes the call from the second endpoint 106 to the first endpoint 104 (TAD 116). In some aspects of the system 100, the gateway 110 forwards received calls to the TAD 116. In some aspects, the TAD 116 plays an announcement (to the calling) party prior to recording the received call. The announcement can be generic to cover all endpoints in the system, or a unique announcement can be made for each endpoint.

In some aspects of the system 100, the gateway 110 polls the Home Network for endpoints and registers the acquired endpoints for TAD services. However, not every endpoint in the system need be registered for TAD services. Further, even if registered, not every endpoint need necessarily receive the same level of service, due to endpoint capabilities and user-selected resource allocation options.

In other aspects of the system 100, a notification function is provided. For example, the gateway 110 may send a notification message in response to a voice mail message being recorded by the TAD 116. There are at least two different notification options that can be enabled. The gateway 110 may initiate the sending of the notification message. This gateway-initiated notification may be automatically engaged in response to a message being recorded. In some aspects, the gateway 110 notifies an endpoint of a message in TAD 116, addressed to that endpoint. For example, the gateway 110 may activate an indicator light on the second endpoint 106 that represents the existence of a saved message in TAD addressed to the second endpoint 106.

In some aspects, the TAD 116 sends a notification message to the gateway 110, indicating that a message has been recorded. Then, the gateway 110 forwards the notification to the addressed endpoint. Regardless, the gateway 110 sends notification information such as the calling telephone number, the name of the calling party, the time of the recording, the recording length, and the memory state of the TAD. If the TAD has a limited memory, a warning can be sent that memory is almost exhausted, and that the memory should be purged.

Alternately, the gateway 110 may receive a request for endpoint TAD information, for example, "Is there a message for endpoint address 555-5555?" Then, the gateway 110 creates a bridge between the TAD 116 and the requesting entity. Note that the requesting entity may be another endpoint in the system 100 or a call made from an external communication medium 114. For example, a call can be made to the Home Network gateway 110 via a conventional wireless phone requesting TAD information.

In other aspects of the system 100, the gateway 100 may receive a request for message playback, in response to sending notification that a message has been recorded. However, the playback request need not necessarily come from the endpoint to which the recorded message was addressed. For example, the gateway 110 may receive a request for message playback of a message addressed to second endpoint 106, from the third endpoint 108.

In some aspects, the gateway 110, in response to receiving a request for message playback, opens an audio path with the TAD 116 and bridges the audio path with an audio path to the requesting entity. Continuing the example started above, the gateway 110 bridges an audio path between the first endpoint 104 (with the embedded TAD 116) and the third endpoint 108 requesting the message that was addressed to the second endpoint 106. The gateway 110 can open an audio path with the TAD 110 by using either in-band or out-of-band signaling to establish audio path connections via the TAD and the requesting entity, and to select the recorded message for playback. In other aspects, the gateway 110 opens an audio path with the TAD 116 by signaling to dial the TAD 116, and then signaling to pick the recorded message for playback. Alternately, the gateway 110 opens an audio path between endpoints, and the endpoints communicate directly, without an intervening gateway.

The system 100 can also be enabled with security features. That is, the TAD 116 receives a password associated with the endpoint to which the call was addressed, prior to sending the recorded message via the audio path. For example, before sending a recorded message addressed to the second endpoint 106, the requesting entity must send a password, such as a PIN number, that is associated with the second endpoint 106.

In other aspects of the system 100, the endpoints include a user interface (UI), not shown, to select a call screening function. Using a phone as an example, the UI can be the phone keypad. Where caller ID is available, the caller information is displayed on the UI. The present invention screening function permits a user to send the call to the TAD, and (optionally) eavesdrop on the call, before deciding whether to answer the call or not. The selection the call screening function is independent of Caller ID services. In fact, the call screening function is typically more useful when the requesting endpoint does not receive Caller ID information. The gateway 110 establishes a bridge for the TAD 116 to receive the call, and then establishes a bridge between the TAD 116 and the requesting endpoint requesting the call screening function.

For example, the second endpoint 106 may request the call screening function. Then, the gateway 110 establishes a bridge between the TAD 116 and the second endpoint 106, so that the second endpoint 106 can receive the caller identification information. If the TAD 116 resides with the first endpoint 104, as shown in FIG. 1, a bridge is established between the first and second endpoints 104/106. In some aspects, the call screening function for calls addressed to an endpoint can be selected by a different endpoint in the system. To continue the example above, the third endpoint 108 can select the call screening function for the second endpoint 106.

Again, the screening function can be enabled with a security feature. That is, the TAD 116 permits a bridge to be established between the TAD 116 and the requesting endpoint in response to receiving a password from the requesting endpoint.

In some aspects, the endpoint that has requested the call screening function may have a user interface microphone muting function. The endpoint microphone can literally be muted, or the gateway can cut the audio to create the muting effect. In this manner, a call can be listened to without fear that the caller will hear the listener monitoring the call. Likewise, the requesting endpoint, following the establishment of a bridge between the TAD and the requesting endpoint, may elect to answer the call. Then, the requesting endpoint microphone is un-muted and the gateway 110 removes the bridge to the TAD 116. That is, the TAD 116 is no longer needed because the listener has elected to answer the call.

Functional Description

FIG. 2 shows a simple voice network with multiple incoming lines and two endpoints. The present invention scales to support many more endpoints, but in the interest of clarity only two are described. The TAD functionality is shown residing in Ext. 2. It can reside in any endpoint, in separate stand-alone customer premises equipment (CPE), or within the gateway (GW) itself. Having the TAD reside within the gateway is a simple implementation, but not always be possible to implement. The TAD can even reside outside the network, for example in an external communications medium Service Provider's Central Office.

The invention typically makes use of out-of-band messaging, which exists in most modern telephony systems, and of the switching and bridging capabilities generally available in using the gateway. The gateway provides the capability of mapping specific endpoints to specific incoming lines, and of providing basic switching capabilities including: routing a call to the appropriate endpoint(s), re-routing a call to different endpoint(s) under specific circumstances, and bridging the same call to two or more endpoints.

Service Discovery

A variety of mechanisms are conventionally known that enable the endpoints (and gateway if necessary) to announce the existence of the TAD, and to register with the TAD for service.

Voice Mail Capture

FIG. 3 shows a simple mapping of external line 1 to endpoint 1 and external line 2 to endpoint 2. The TAD resides in Ext. 2. It is assumed that service discovery has occurred. If a call comes in on line 2 and goes unanswered after a user-prescribed number of rings, the TAD answers the call, plays the user-prescribed Line 2 greeting, and provides the calling party with an opportunity to leave a voice message. This operation is directly analogous to existing TADs.

If a call comes in on line 1 and goes unanswered after a user-prescribed number of rings, endpoint 1 "forwards" the call to the TAD. It can do this by using out-of-band messages as shown in Table 1.

TABLE 1

Out-of-Band Messaging to Forward a Call to a TAD

| Source | Destination | Message |
| --- | --- | --- |
| endpoint 1 | GW | Forward call to Endpoint 2 |
| endpoint 1 | endpoint 2 | Request TAD Activation of current call |
| endpoint 2 | endpoint 1 | Acknowledge TAD Activation. |

Alternatively, if the gateway is aware of the TAD and capable of treating the TAD as a separate device, then the out-of-band signaling is simplified, as shown in Table 2.

TABLE 2

Alternative Out-of-Band Messaging to Forward a Call to a TAD

| Source | Destination | Message |
| --- | --- | --- |
| endpoint 1 | GW | Forward call to TAD |

Voice Mail Notification

Once the TAD has one or more messages, it notifies other endpoints that these messages have been received. It can repeat this notification each time the message list changes, in response to a new messages, deleted messages, or messages that have changed state, for example from 'New' to 'Saved'. Alternately, The TAD can simply notify the other endpoints periodically, for example every 30 seconds.

There are at least two alternatives for how notification is accomplished:

1. If the Gateway is capable of performing the notification service, then the TAD delivers the message list to the Gateway, and the Gateway delivers the message list to all the endpoints in its list.

2. If the Gateway is not capable of performing the notification service, then the TAD itself can notify each endpoint that has registered with it (via Service Discovery).

Once an endpoint has received a message list, it can display this list to the user in an easy and intuitive manner. One alternative is to display the information on the liquid crystal display (LCD) of the phone as shown in Table 3.

TABLE 3

Sample Message Notification Display

| Incoming Line | CLID | Time | Msg. Length | State |
| --- | --- | --- | --- | --- |
| 1 | 800-555-1212 | Aug. 10 @ 12:00 P | 30 sec | New |
| 2 | 800-555-1212 | Aug. 10 @ 10:00 A | 60 sec | New |
| 2 | 800-555-9111 | Aug. 09 @ 1:30 P | 45 sec | Saved |

The display can provide a notice of when there are new messages, for example, by an icon on the LCD or a dedicated LED. The user can scroll through the displayed list and select a particular message to review, call, or delete. The user can change simple formatting, sort order, etc., if the default display is not preferred.

Voice Mail Playback

Voice messages are stored in the format 'native' to the digital phones, for example, voice over Home Network (VoHN). The user is able to retrieve, save, or delete individual voice mail messages from any endpoint within the Home Network, even those not configured to service the incoming line on which the call was received, or from any external phone capable of calling the Home Network. Moreover, the user can explicitly select a specific message to playback first, rather than having to playback the messages in the same order as they were recorded.

FIG. 4 illustrates the process for playback of a recorded message. The user requests a message to be played back on endpoint 1. An out-of-band message is sent via the GW to the phone with TAD (endpoint 2), indicating which message to playback using some appropriate index value. An audio path is established between endpoint 1 and TAD via the GW, with the GW bridging the audio. The TAD then plays the message back via the open audio path. If the user wants to playback another message, the TAD can be signaled either using the same out-of-band signal as before, or by using in-band tones. Both mechanisms are possible. Note that the audio path is simply closed by hanging-up the phone (endpoint 1).

Another approach is to simply dial the TAD. The TAD may have its own internal endpoint number assigned. This establishes an audio path from endpoint 1 to the TAD. Then, in-band tones can be used to retrieve the messages. It's possible to playback messages in an order different than the order they were recorded in using this approach as well.

From an external phone, or from a non-addressed endpoint, the user can be required to enter a user-defined password prior to activation of the screening function. Typically, the user must define a password before this function becomes operational. When the password is defined, it is stored in non-volatile memory so that it will survive power outages.

Memory Requirements

Assuming 64 kilobyte (Kb) pulse code modulation (PCM) or other comparable format, and no further compression, the TAD storage requirements are approximately 8 kilobytes per second (KBps)=480 KB for each minute of messages=28.8 megabytes (MB) for each hour of messages, including incoming messages, greetings, announcements, and memos. This memory may be made capable of retaining its contents without power.

Playback If TAD Resides with Endpoint

If voice messages are stored at the TAD, and the TAD resides with an endpoint, then messages can typically only be retrieved if the endpoint is not in use on another call or recording another voice mail message. Alternatively, the endpoint can be provided with capabilities to support two or more simultaneous voice paths.

Playback If TAD Is On Gateway or a Separate CPE

If voice messages can be stored on the gateway or a separate CPE, sufficient memory is typically not a problem, as a hard disk can easily supply the required amount of non-volatile storage. If TAD is on a separate CPE, then it might be desirable to allow the TAD to support two or more simultaneous voice paths.

Call Screening

With conventional TADs, the user must have physical proximity to the TAD to screen calls. The present invention makes call screening possible from every endpoint in the Home Network.

On an endpoint not addressed by an incoming call, the user may be required to enter the user-defined password (as defined above under voice mail playback) prior to activation of the screening function. This requirement provides support for network configurations where some endpoints have physical security (such as a lockable home office) and some users with legitimate access to the network are not permitted to answer the phone line of the incoming call.

Each digital endpoint in the Home Network can have a 'Screen' button (either hard or soft) that the user can press during the interval when an incoming call is ringing or being answered by the TAD. Pressing the Screen button while the TAD is 'answering' the call causes the endpoint to be bridged into the call with its microphone muted, using out-of-band messaging similar to that shown in Table 4.

TABLE 4

Out-of-Band Messaging to Screen Call Being Processed By TAD

| Source | Destination | Message |
|---|---|---|
| endpoint 1 | GW | Bridge endpoint 1 to TAD's Call |
| endpoint 1 | endpoint 1 | Mute (Microphone) |

If the User 'hangs up' the phone during screening, the bridge can be taken down without notification to the calling party, see Table 5.

TABLE 5

Out-of-Band Messaging to Disconnect From Screened Call

| Source | Destination | Message |
|---|---|---|
| endpoint 1 | GW | Remove Bridge to endpoint 1 from TAD's Call |
| endpoint 1 | endpoint 1 | Reset Microphone |

If the User elects to answer the call, then the microphone is un-muted and the TAD is stopped, see Table 6.

TABLE 6

Out-of-Band Messaging to Answer Call Currently Being Screened

| Source | Destination | Message |
|---|---|---|
| endpoint 1 | TAD | Abort Current Message Capture |
| endpoint 1 | endpoint 1 | Un-Mute (Microphone) |
| endpoint 1 | GW | Un-bridge TAD from Call |

Pressing the Screen button while an incoming call is ringing causes the call to be immediately forwarded to the TAD, and the endpoint is bridged into the call with its microphone muted, see Table 7. If there are two or more incoming calls ringing at the same time, the user can be presented with a list if the incoming calls, using CLID for example, and given the option of selecting which call to screen.

TABLE 7

Out-of-Band Messaging to Screen Incoming Call In Ringing State

| Source | Destination | Message |
|---|---|---|
| endpoint 1 | GW | Forward call to endpoint 2 |
| endpoint 1 | endpoint 2 | Request TAD Activation of current call |
| endpoint 2 | endpoint 1 | Acknowledge TAD Activation. |
| endpoint 1 | GW | Bridge endpoint 1 to TAD's Call |
| endpoint 1 | endpoint 1 | Mute (Microphone) |

Figure 5C:
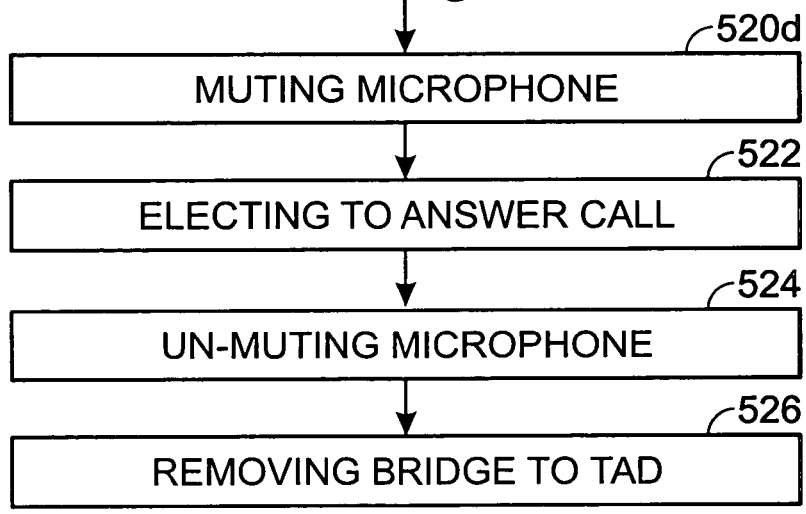
Figure 5A:
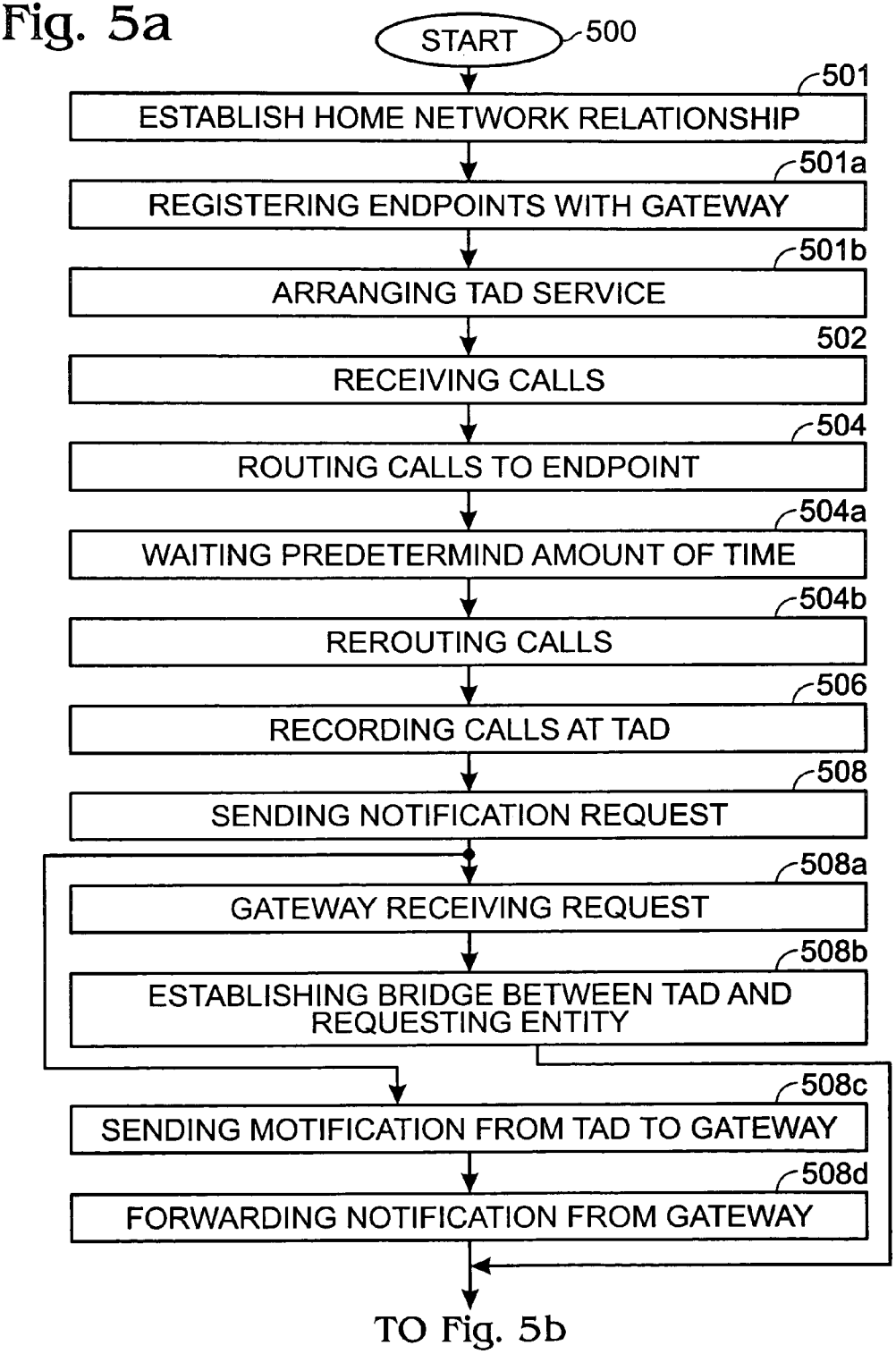

FIGS. 5a through 5c are flowcharts illustrating the present invention method for answering Home Network telephone calls. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 receives telephone calls addressed to a Home Network endpoint. Step 502 receives external line calls from communication media such as voice over ATM (VoATM), voice over cable modem (VoCM), voice over DSL (VoDSL), voice over Internet protocol (VoIP), fixed wireless access (FWA), fibre to the home (FTTH), integrated service digital network (ISDN), plain old telephone service (POTS), or internal line calls from Home Network endpoints. Step 504 routes the received calls from a Home Network gateway to the endpoint. In some aspects, Step 505 (not shown) plays an announcement in addition to recording the received call in Step 506. The announcement can be before and/or after recording the message. Step 506 automatically records the received call at a telephone answering device (TAD). Typically, automatically recording the received call at a TAD includes recording calls that are not answered by the addressed endpoint. In other aspects, Step 506 forwards the received call to the TAD from the gateway.

In some aspects of the method, automatically recording the received call in Step 506 includes recording the received call at an entity such as a Home Network endpoint, the gateway, and an external line service provider facility. The service provider facility may be a telephone central office or a web site.

In some aspects, receiving telephone calls addressed to a Home Network endpoint in Step 502 includes receiving calls addressed to an endpoint device selected from the group including telephones, fax machines, personal data assistants (PDAs), personal computers (PCs), modems, multi-function peripherals (MFPs), video-telephones, wireless communication devices, and hardwired communications devices.

In some aspects of the method a further step, Step 501, establishes a Home Network relationship between the gateway and a plurality of Home Network endpoints. Then, receiving telephone calls addressed to a Home Network endpoint in Step 502 includes receiving calls addressed to a first endpoint, for example, and automatically recording the received call at a TAD in Step 506 includes recording the call at a second endpoint TAD. In some aspects, routing the received calls from a Home Network gateway to the endpoint (Step 504) includes substeps involving the gateway. Step 504a waits a predetermined amount of time for a response from the first endpoint. Step 504b rerouting the call from the first endpoint to the second endpoint.

In other aspects of the method, establishing a Home Network relationship between the gateway and a plurality of Home Network endpoints (Step 501) can be considered as substeps. Step 501*a* registers endpoints with the gateway. Step 501*b* arranges TAD services for registered endpoints. These steps are also referred to a service discovery.

In another aspect of the method, receiving telephone calls addressed to a Home Network endpoint in Step 502 includes receiving a call addressed to an endpoint. More specifically, the Home Network maps endpoint addresses to telephone numbers. Then, the Home Network receives a call for a telephone number and sends the call to endpoint addresses mapped to that telephone number. The method comprises a further step. Step 508 sends notification that a message has been recorded for the addressed endpoint. Sending notification that a message has been recorded includes sending information such as the calling telephone number, the name of the calling party, the time of the recording, the recording length, or the TAD memory state (the amount of memory reserve in the TAD for additional recorded messages).

In one aspect, sending notification that a message has been recorded in Step 508 includes the gateway initiating the notification. Alternately, sending notification that a message has been recorded includes substeps. In Step 508*a* the gateway receives a request for the addressed endpoint TAD information. In Step 508*b* the gateway creates a bridge between the TAD and a requesting entity. In another alternative, sending notification that a message has been recorded includes sending a notification from the TAD to the addressed endpoint.

Some aspects of the method involve alternate substeps for sending notification that a message has been recorded (Step 508). Step 508*c* sends a notification message from the TAD to the gateway that a message has been recorded. Step 508*d* forwards the notification from the gateway.

Other aspects of the method include an additional step. Step 510 requests a message for playback, in response to receiving notification (Step 508) that a message has been recorded. In one aspect, requesting a message for playback includes requesting a message for an addressed endpoint, by a requesting entity.

Step 512 opens an audio path with the TAD, in response to requesting a message for playback (Step 510). Step 514 bridges the audio path with an audio path to the requesting entity. Bridging the audio paths in Step 514 includes using either in-band or out-of-band signaling to performing substeps. Step 514*a* establishes audio path connections via the TAD and the requesting entity. Step 514*b* picks the recorded message for playback. That is, a specific message(s) is selected. Alternately it can be stated that, opening an audio path with the TAD in Step 512 includes signaling to dial the TAD.

Step 516, prior to sending the recorded message via the audio path, enters a password associated with the addressed endpoint. Step 518 sends the requested message. Note that the security feature (Step 516) is not required in some aspects of the method.

In some aspects, receiving a call in Step 502 includes receiving caller identification information. Step 520 selects the call screening function in response to receiving the call (Step 502). It should be understood that selecting the call screening function may include a second endpoint selecting the call screening function for a call addressed to a first endpoint.

Selecting the call screening function typically includes substeps. In some aspects, Step 520*a* supplying a password from the requesting endpoint. Step 520*b* establishes a bridge for the TAD to receive a call addressed to the endpoint. When a password is required (Step 520*a*), then establishing a bridge between the TAD and the endpoint requesting the call screening function includes establishing a bridge between the TAD and the requesting endpoint in response to entering the password. Step 520*c* establishes a bridge between the TAD and the endpoint requesting the call screening function. Step 520*d* mutes the microphone of the endpoint requesting the call screening function.

In some aspects, Step 522, following the establishment of a bridge between the TAD and the requesting endpoint (Step 520*b*), the requesting endpoint elects to answer the call. Then, Step 524 un-mutes the requesting endpoint microphone. Step 526 removes the bridge to the TAD.

A system and method are providing for establishing TAD services in the context of a Home Network telephone system. Examples have been provided of some specific embodiments of the invention. Likewise, examples have been given of signaling mechanisms and specific TAD residences. Other examples have been given of TAD information collection, enablement, and notification uses. However, the invention is not limited to merely these examples. Other variations and embodiments of the invention will occur to those skilled in the art.

We claim:

1. A system for answering Home Network telephone calls, the system comprising:
 a first and a second Home Network endpoint, each having a port to transceive Home Network telephone communications;
 a gateway having a port to transceive telephone communication between an endpoint and external communication media, wherein the gateway receives calls addressed to the first endpoint, and wherein the gateway polls the Home Network for endpoints and registers the acquired endpoints for telephone answering device (TAD) services; and
 a second endpoint TAD having a port to accept and automatically record received call messages addressed to, but not answered by the first endpoint.

2. The system of claim 1 further comprising:
 an external line communication medium to transceive telephone communications with the gateway, the communication medium selected from the group including voice over ATM (VoATM), voice over cable modem (VoCM), voice over DSL (VoDSL), voice over Internet protocol (VoIP), fixed wireless access (FWA), fibre to the home (FTTH), integrated service digital network (ISDN), and plain old telephone service (POTS).

3. The system of claim 2 wherein the endpoints are selected from the group including telephones, fax machines, personal data assistants (PDAs), personal computers (PCs), modems, multi-function peripherals (MFPs), video-telephones, wireless communication devices, and hardwired communications devices.

4. The system of claim 1 wherein the gateway polls the Home Network for endpoints and registers the acquired endpoints for TAD) services.

5. The system of claim 1 wherein the gateway forwards received calls to the TAD.

6. The system of claim 1 wherein the gateway initiates the sending of the notification message to the addressed endpoint and creates a bridge between the TAD and the addressed endpoint in response to a request from the addressed endpoint.

7. The system of claim 1 wherein the gateway notifies an endpoint of a message in TAD, addressed to that endpoint.

8. The system of claim 7 wherein the TAD sends a notification message to the gateway, indicating that a message has been recorded; and, wherein the gateway forwards the notification to the addressed endpoint.

9. The system of claim 7 wherein the gateway sends notification information selected from the group including the calling telephone number, the name of the calling party, the time of the recording, the recording length, and the TAD memory state.

10. The system of claim 1 wherein the gateway, in response to sending notification that a message has been recorded, receives a request for message playback.

11. The system of claim 10 wherein the gateway receives a request for message playback of a message addressed to the first endpoint, from the second endpoint.

12. The system of claim 10 wherein the gateway, in response to receiving a request for message playback, opens an audio path with the TAD and bridges the audio path with an audio path to the requesting entity.

13. The system of claim 12 wherein the gateway opens an audio path with the TAD by using signaling selected from the group including in-band and out-of-band signaling for establishing audio path connections via the TAD and the requesting entity, and selecting the recorded message for playback.

14. The system of claim 13 wherein the gateway opens an audio path with the TAD by signaling to dial the TAD, and signaling to pick the recorded message for playback.

15. The system of claim 12 wherein the TAD, prior to sending the recorded message via the audio path, receives a password associated with the endpoint to which the call was addressed.

16. The system of claim 1 wherein the endpoints include a user interface to select a call screening function.

17. The system of claim 16 wherein the requesting endpoint receives caller identification information;
wherein a requesting endpoint selects the call screening function in response to a call; and,
wherein the gateway establishes a bridge for the TAD to receive the call, establishes a bridge between the TAD and the requesting endpoint requesting the call screening function.

18. The system of claim 17 wherein the second endpoint selects the call screening function for calls addressed to the first endpoint.

19. The system of claim 17 wherein the TAD permits a bridge to be established between the TAD and the requesting endpoint in response to receiving a password from the requesting endpoint.

20. The system of claim 17 wherein the requesting endpoint has a user interface microphone muting function.

21. The system of claim 20 wherein the requesting endpoint, following the establishment of a bridge between the TAD and the requesting endpoint, elects to answer the call, and un-mutes the microphone; and,
wherein the gateway removes the bridge to the TAD.

22. The system of claim 1 wherein the TAD, in addition to automatically recording the received call message, plays a recorded announcement.

23. A system for answering Home Network telephone calls, the system comprising:
a first and a second Home Network endpoint, each endpoint having a port to transceive Home Network telephone communications;
a gateway having a port to transceive telephone communication between an endpoint and external communication media, wherein the gateway p0118 the Home Network for endpoints and registers the acquired endpoints for TAD services, receives calls addressed to the first endpoint, waits a predetermined amount of time for a response from the first endpoint, and reroutes the call from the first endpoint; and,
a second endpoint telephone answering device (TAD) having a port to accept and automatically record received call messages addressed to, but not answered by the first endpoint, and to send a notification message to the addressed endpoint that a message has been recorded for the addressed endpoint.

* * * * *

UNITED STATES PATENT AND TRADEMARK OFFICE
CERTIFICATE OF CORRECTION

PATENT NO. : 7,162,013 B2  
APPLICATION NO. : 10/313863  
DATED : January 9, 2007  
INVENTOR(S) : Sherman Gavette and Carl Mansfield It is certified that error appears in the above-identified patent and that said Letters Patent is hereby corrected as shown below:

Claim 23 has been incorrectly printed. In col. 14, line 26, the phrase "pol18" appears. The phrase should be --polls--. Claim 23 should be printed as follows:

Col. 14, Line 18 should read

23. A system for answering Home Network telephone calls, the system comprising:
        a first and a second Home Network endpoint, each endpoint having a port to transceive Home Network telephone communications;
        a gateway having a port to transceive telephone communication between an endpoint and external communication media, wherein the gateway polls the Home Network for endpoints and registers the acquired endpoints for TAD services, receives calls addressed to the first endpoint, waits a predetermined amount of time for a response from the first endpoint, and reroutes the call from the first endpoint; and,
        a second endpoint telephone answering device (TAD) having a port to accept and automatically record received call messages addressed to, but not answered by the first endpoint, and to send a notification message to the addressed endpoint that a message has been recorded for the addressed endpoint.

Signed and Sealed this

Twenty-seventh Day of March, 2007

JON W. DUDAS  
*Director of the United States Patent and Trademark Office*